US006953224B2

(12) United States Patent
Seto et al.

(10) Patent No.: US 6,953,224 B2
(45) Date of Patent: Oct. 11, 2005

(54) SEAT CUSHION FOR VEHICLE SEAT UNIT

(75) Inventors: Takayuki Seto, Hiroshima (JP); Ryugo Fujihara, Hiroshima (JP); Hiroshi Sainose, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 217 days.

(21) Appl. No.: 10/405,938

(22) Filed: Apr. 3, 2003

(65) Prior Publication Data

US 2003/0214161 A1 Nov. 20, 2003

(30) Foreign Application Priority Data

Apr. 4, 2002 (JP) ........................................ 2002-102638

(51) Int. Cl.[7] .............................................. A47C 31/00
(52) U.S. Cl. ................................. 297/217.3; 340/667
(58) Field of Search .......................... 297/217.1, 217.3; 340/667; 5/652, 653

(56) References Cited

U.S. PATENT DOCUMENTS

| | | | | |
|---|---|---|---|---|
| 4,242,672 A | * | 12/1980 | Gault ....................... | 340/573.4 |
| 5,896,090 A | * | 4/1999 | Okada et al. ................ | 340/667 |
| 6,108,842 A | * | 8/2000 | Severinski et al. ............ | 5/653 |
| 6,371,552 B1 | * | 4/2002 | Narita et al. ............ | 297/180.12 |
| 6,428,095 B1 | * | 8/2002 | Hirata ...................... | 297/217.3 |
| 6,609,752 B2 | * | 8/2003 | Inoue ....................... | 297/217.3 |

FOREIGN PATENT DOCUMENTS

JP          2000-318503 A      11/2000

OTHER PUBLICATIONS

Patent Abstracts of Japan vol. 2002, No. 07, Jul. 3, 2002 & JP 2002 065396 A (Daihatsu Motor Co Ltd), Mar. 5, 2002 Abstract.
Patent Abstracts of Japan vol. 1999, No. 03, Mar. 31, 1999 & JP 10 329597 A (Ikeda Bussan Co Ltd), Dec. 15, 1998 Abstract.
European Search Report Dated Sep. 10, 2003.

* cited by examiner

*Primary Examiner*—Peter M. Cuomo
*Assistant Examiner*—Joseph Edell
(74) *Attorney, Agent, or Firm*—Nixon Peabody LLP; Donald R. Studebaker

(57) ABSTRACT

A seat cushion for a vehicle seat unit comprising a cushioning pad upholstered with a seat covering and a flexible but inelastic planar film with an electrically conductive element buried therein that is disposed between the cushioning pad and the seat covering. The cushioning pad has tuck-in grooves in which the seat covering is locally retained. The planar film is thickened at locations where the planar film transverses the tuck-in grooves for reinforcement.

7 Claims, 10 Drawing Sheets

SEAT CUSHION FOR VEHICLE SEAT UNIT

BACKGROUND OF THE INVENTION

1. Field of the Invention

The present invention relates to a seat cushion for a vehicle seat unit that comprises a cushioning pad such as an urethane foam upholstered with a seat covering, and, more particularly, to a seat cushion for a vehicle seat unit in which a planer electrically conductive element is disposed between a cushioning pad and a seat covering.

2. Description of Related Art

Typically, a seat cushion of a front seat unit or a rear seat unit for a vehicle comprises an elastic cushioning pad such as an urethane pad and a seat covering with which the elastic cushioning pad is upholstered. Some types of seat cushion are provided with a planar conductive clement such as comprised of a flexible but inelastic planar film with an electrically conductive element buried therein (that is hereafter referred to as a planar conductive film) that is disposed between the cushioning pad and the seat covering. In one example, the planar conductive film is used as a planar sensor device that detects an occupant sitting on the seat cushion or an occupant such as an infant or a small child secured in a child safety seat on the seat cushion.

Reference is made to FIGS. 10 through 15 showing prior art seat cushions with a planer conductive film embedded in a seat cushion between a cushioning pad and a seat covering for the purpose of providing a brief background that will enhance an understanding of the present invention.

Referring to FIG. 10 showing one of the prior art seat cushions for a vehicle seat unit, a seat cushion 80 comprises an elastic cushioning pad 81 preferably made of an urethane foam with its seating surface entirely upholstered with a seat covering (not shown). The seat cushion 80 is provided with a flexible but inelastic planar conductive film 82 embedded therein between the seat cushioning pad 81 and the seat covering. The elastic cushioning pad 81 has a plurality of U-shaped tuck-in grooves 83 (only one of which is shown) extending in both lengthwise and transverse directions. The seat covering is locally retained the tuck-in grooves 83 for preserving a designed appearance of the seat cushion 80, and strip sections of the planer conductive film 82 are laid in the tuck-in grooves 83 in a U- or V-shape. According to the seat cushion 80, when the seat cushion 80 repeatedly experiences an external impact load from above, while the cushioning pad 81 elastically contacts and recovers repeatedly, nevertheless, the planar conductive film 82 does not contract. In consequence, the nip sections of the planar conductive film 82 in the tuck-in grooves 83 are repeatedly loosened and stretched and led into breakage or damage as shown in FIG. 11. Such breakage or damage of the strip section of the planar conductive film 82 causes an electric disconnection of the electrically conductive element at the broken or damaged strip section laid in the tuck-in groove 83. The electric disconnection of the electrically conductive element is made more marked, if the tuck-in grooves 83 is made deeper for design requirements. Modified shapes of tuck-in groove 83 such as shown in FIGS. 12 through 15 are conceivably effective to eliminate an occurrence of breakage or damage of the strip section of the planar conductive film 82 in the tuck-in groove 83.

Referring to FIG. 12 showing a seat cushion 80 having one of the variations of tuck-in groove, a cushioning pad 81 has a tuck-in groove 83 locally provided with bridges 84 so that the tuck-in groove 83 is locally made shallow at locations where strip sections of a planar conductive film 82 traverse the tuck-in groove 83.

According to the seat cushion 80 having the cushioning pad 81 with the tuck-in grooves 83 locally made shallow, while the planar conductive film 82 is advantageously prevented from causing breakage or damage that is conductive to an electric disconnection of the electrically conductive element buried in the planer conductive film 82, nevertheless, the tuck-in groove 83 at the bridges 84 is made too shallow for the seat covering to provide a sufficient tuck-in depth for the seat covering. This tends toward an unattractive appearance of the seat cushion 80 and, in consequence, leads the seat unit into less marketability.

Referring to FIG. 13 showing a seat cushion 80 having another variation of tuck-in groove, a cushioning pad 81 has a tuck-in groove 83 locally provided a narrow inverted trapezoidal recesses 85 across the tuck-in grooves 83 at locations where strip sections of a planar conductive film 82 are laid in the tuck-in grooves 83. The inverted trapezoidal recess 85 comprises a flat bottom 85a at a level with the bottom of the tuck-in groove 83 and walls 85b slanting in opposite directions. After laying a strip section of the planer conductive film 82 in the inverted trapezoidal recess 85 in keeping with the walls 85a and 85b, triangular retaining pads 85c are forced into triangular spaces formed in the cushioning pad 81 by the inverted trapezoidal recess 85 at opposite sides of the tuck-in groove 83 so as thereby to prevent the strip section of the planer conductive film 82 from coming up. The triangular retaining pad 85 is preferably different in material from the cushioning pad 81.

According to the tuck-in groove 83 shown in FIG. 13, while the strip section of the planar conductive film 82 is prevented from coming up, and hence from being broken or damaged, by the triangular holding pads 85, nevertheless, the incorporation of the triangular retainer pads 85 leads to an increase in costs and manpower for manufacturing the seat cushion 80.

Referring to FIGS. 14 and 15 showing a seat cushion 80 having still another variation of tuck-in groove, a cushioning pad 81 has a tuck-in groove 83 and inverted trapezoidal grooves 86 across the tuck-in groove 83 at locations where strip sections of a planar conductive film 82 is laid in the tuck-in grooves 83. The inverted trapezoidal groove 86 at opposite sides has an open top end flanked with a pair of rounded retaining protrusions 87 at each of opposite sides of the tuck-in groove 83. Each rounded retaining protrusion 87 is formed as an integral portion of the cushioning pad 81. The strip section of the planar conductive film 82 is forced into the inverted trapezoidal groove 86 passing through the retaining protrusions 87 and laid in the tuck-in groove 83.

According to the tuck-in groove 83 shown in FIGS. 14 and 15, the strip section of the planar conductive film 82 is prevented from coming up and out of the tuck-in groove 83 by the retaining protrusions 87. While the tuck-in groove 83 thus constructed is advantageous in preventing the planar conductive film 82 from being damaged or broken, and hence an electric disconnection of the electrically conductive element, nevertheless, the tuck-in groove 83 inevitably reaches aggravation of setting easiness of the strip sections of the planar conductive film 82. That is, if the retaining protrusion 87 is made larger in order to prevent the strip section of the planar conductive film 82 from coming up and out of the tuck-in groove 83, it becomes an onerous task to tuck the strip section of the planar conductive film 82 in the tuck-in groove 83.

Another idea on eliminating an occurrence of breaking of an electrically conductive layer or film of a planar occupant sensor of a seat unit is disclosed in Japanese Unexamined Patent Publication No. 2000-318503. This planar occupant sensor has a protective sheet with an extension inserted between cushioning pad of a seatback and an adhesive layer so as to prevent the electrically conductive layer or film from breaking. However, the protection sheet is used only for protecting the electrically conductive layer or film. In addition, the electrically conductive layer or film is not laid in tuck-in grooves.

SUMMARY OF THE INVENTION

It is an object of the present invention to provide a seat cushion for a vehicle seat unit of the type having a flexible but inelastic planar conductive film disposed between a cushioning pad with a plurality of tuck-in grooves and a seat covering and locally laid in the tuck-in grooves in which the flexible but inelastic planar conductive film is reinforced at locations where the flexible but inelastic planar conductive film traverses the tuck-in grooves so as to prevent an occurrence of what is called a pattern crack (an electric disconnection) due to breakage or damage of the flexible but inelastic planar conductive film.

It is another object of the present invention to provide a seat cushion with a flexible but inelastic planar conductive film disposed between a cushioning pad with a plurality of tuck-in grooves and a seat covering and locally laid in the tuck-in grooves in which, when an external impact load is applied to the seat cushion, the flexible but inelastic planar conductive film causes widespread flexure in response to contraction of the cushioning pad and diminishes local slacks or inelastic bending of the flexible but inelastic planar conductive film laid in the tuck-in grooves consequently.

It is a further object of the present invention to provide a seat cushion with a flexible but inelastic planar conductive film disposed between a cushioning pad with a plurality of tuck-in grooves and a seat covering and locally laid in the tuck-in grooves which can keeps an attractive appearance.

The foregoing objects of the present invention are achieved by a seat cushion for a vehicle seat unit that comprises a cushioning pad such as an urethane foam, a seat covering such as a cloth seat covering or a leather seat covering with which the cushioning pad is upholstered, and a flexible but inelastic planar conductive element (which comprises a flexible and inelastic film and an electrically conductive element buried in the flexible and inelastic film and is hereafter referred to as a planer conductive film for simplicity) disposed between the cushioning pad and the seat covering. The cushioning pad has a plurality of generally U-shaped tuck-in grooves in which the seat covering is locally retained. The planer conductive element is locally made thicker for reinforcement than the remaining portion thereof at locations where the planar conductive element traverses the tuck-in grooves. The planar conductive film is such as to be used as a planar sensor device that detects presence of an occupant sitting on the seat cushion or an occupant such as an infant or a small child secured in a child safety seat on the seat cushion or as a planar seat heater.

According to the seat cushion, the planar conductive film causes less local slacks or inelastic bending in the tuck-in grooves through the instrumentally of the reinforcement and sustains less breakage or damage. In consequence, the planar conductive film prevents the electrically conductive element buried in the film from sustaining what is called pattern cracks (electric disconnections). Even if the planar conductive film causes local slacks or inelastic bending in the tuck-in grooves when the seat cushion contracts due to an external impact force from above, the planar conductive film slides on the cushioning pad to produce widespread flexure over the entire area thereof, so that the local slacks or inelastic bending in the tuck-in grooves are dispersed through the flexure and then diminished. Since the tuck-in grooves are not crushed, the seat cushion keeps its attractive appearance.

According to another aspect of the present invention, the planer conductive film is locally made more slippery and/or more elastic for reinforcement than the remaining portion thereof at locations where the planar conductive element traverses the tuck-in grooves. The planar conductive film at the slippery or elastic portions diminishes in frictional drag against the cushioning pad. The slippery or elastic portion is realized by fixing a segmental plastic piece made of polyethylene terephthalate or polyimide to the planar conductive film, or otherwise by thickening the planar conductive film so as to provide it locally with increased elasticity.

The planar conductive film provided with reinforced portions made slippery or elastic is hardly bendable in the tuck-in grooves, so that the planar conductive film prevents the electrically conductive element buried in the film from sustaining what is called pattern cracks (electric disconnections) due to slacks or inelastic bending. In addition, even if the planar conductive film causes local slacks or inelastic bending in the tuck-in grooves when the seat cushion contracts due to an external impact force from above, the planar conductive film slides on the cushioning pad to produce widespread flexure over the entire area thereof so that the local slacks or inelastic bending in the tuck-in grooves are dispersed through the widespread flexure of the planar conductive film and then diminished. Accordingly, the planar conductive film is protected against an electric disconnection without making the tuck-in grooves of the cushioning pad shallow or otherwise blocking portions of the tuck-in grooves crossed over by the planar conductive film.

The reinforced portion may be formed by fixing a segmental plastic piece to either one or both of opposite surfaces of the planar conductive film. The segmental plastic piece is preferred to be made of polyethylene terephthalate or polyimide in light of thickness, slipping performance and elasticity.

The reinforced portion may be formed in a lengthwise direction of the planer electrically conductive element from sustaining pattern cracks or electric disconnections.

The planar conductive film at the reinforced portions may be provided with integrated tongues extending perpendicularly from opposite lengthwise sides of the planar conductive film, in other words in a lengthwise direction of the tuck-in groove. The planar conductive film at the reinforced portions is prevented from causing positional displacement due to increased thickness, enhanced slippage performance and elasticity when the seat cushion receives external impact force from above and, in consequence, provides positioning convenience.

The planar conductive film may be used as a planar sensor device that detects an occupant condition, e.g. presence of an occupant or a commodity, occupant type and/or occupant location, in order to control actuation of, for example, an occupant associated protection system such as an air bag in response to a detected occupant condition. The planar sensor device includes a planar array of pressure sensors operative to turn conductive when receiving external impact force from above. The planar sensor device is prevented from causing a pattern crack or electric disconnection of the planar array of pressure sensors, the occupant protection system is appropriately controlled in actuation.

The planar conductive film may be used as a planar seat heater. The planar seat heater is prevented from causing a pattern crack or electric disconnection of a heating wire.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings, and in which.

DETAILED DESCRIPTION OF THE PREFERRED EMBODIMENTS

Figure 1:
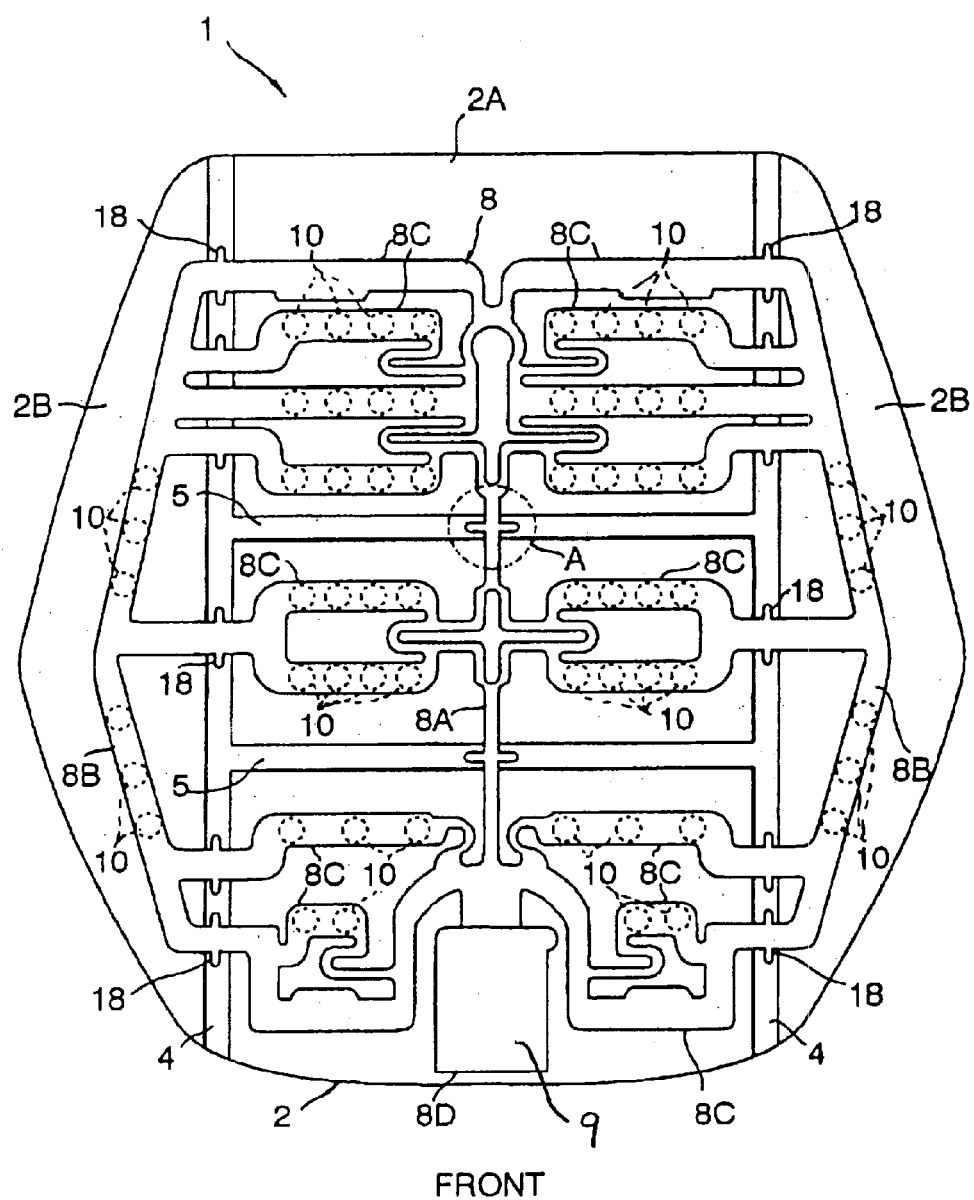
FIG. 1 is a plan view of a seat cushion for a vehicle seat unit according to an embodiment of the present invention.
Figure 2:
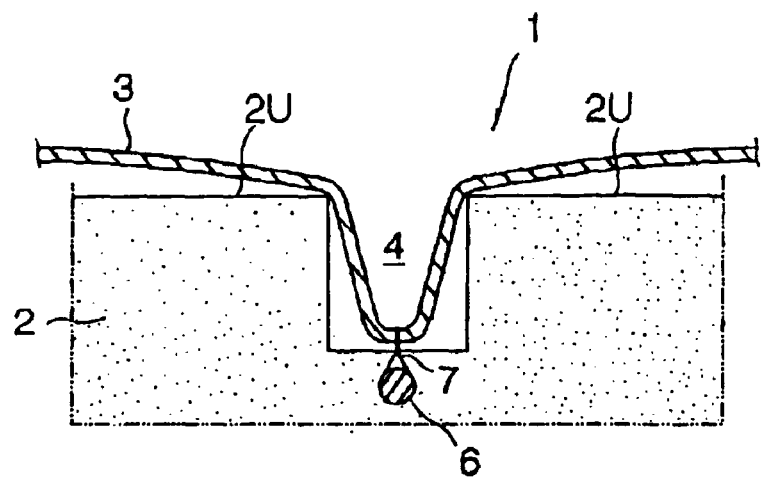
FIG. 2 is a cross sectional view of a part of the seat cushion upholstered with a seat covering.
Figure 3:
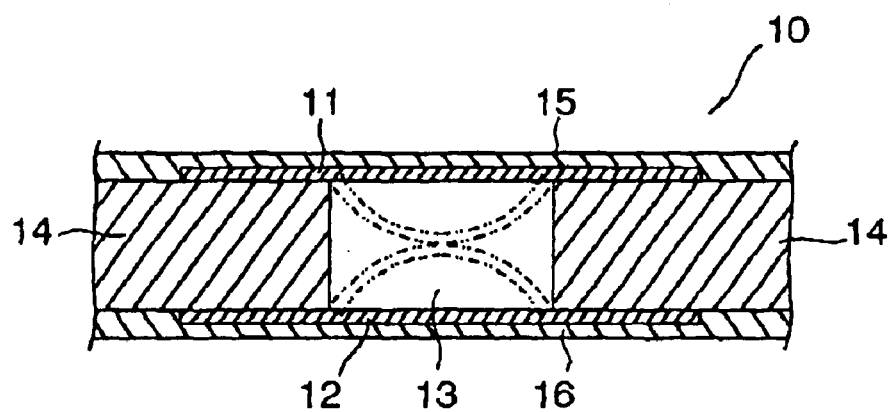
FIG. 3 is a cross sectional view of a pressure sensor.
Figure 4:
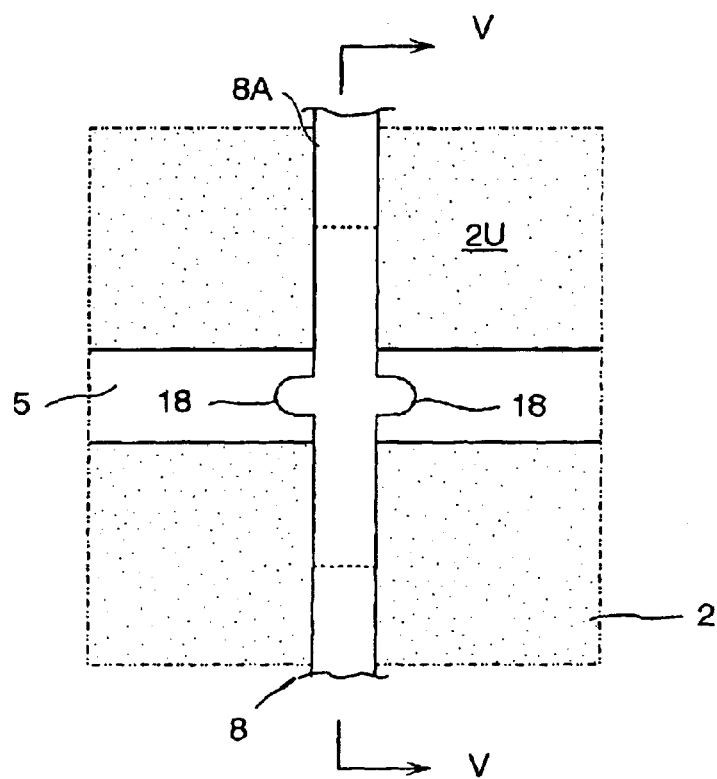
FIG. 4 is an enlarge plan view of a part A of the seat cushion.

Referring to the drawings in detail, and, in particular, to FIGS. 1 to 3 showing a seat cushion 1 of a vehicle seat unit according to an embodiment of the present invention, the seat cushion 1 comprises an elastic cushioning pad 2 made of such as urethane, a patterned planar conductive film 8 that is flexible but inelastic and a seat covering 3. The elastic cushioning pad 2 is formed as one integral piece and comprises three sections, namely a seat section 2A and two side support sections 2B at opposite side of the seat section 2A. The elastic cushioning pad 2 has a lengthwise tuck-in groove 4 formed along a border between the seat section 2A and each side support section 2B and two transverse tuck-in grooves 5 formed in a central portion of the seat section and extending between the opposite lengthwise tuck-in grooves 4. As shown in FIG. 2, wires 6 are embedded below the respective tuck-in grooves 4 and 5 in the elastic cushioning pad 2. The wires 6 has hooks 7 partly protruding into the tuck-in grooves 4 and 5 so as retain the seat covering 3 locally in the tuck-in grooves 4 and 5 in U- or V-shape for preserving a designed configuration of the seat cushion 1.

The patterned planer conductive film 8 such as made of a synthetic resin film is comprised of a center lengthwise strip section 8A, side lengthwise strip sections 8B at centers of the side support sections 2B, a number of transverse strip sections 8C connecting the side lengthwise strip sections 8B to the center lengthwise strip section 8A and a base section 8D at a front end of the center lengthwise strip section 8A. The patterned planar conductive film 8 is provided with a plurality of pressure sensors 10 buried in the lengthwise and transverse strip sections 8A, 8B and 8C and a controller 9 with a built-in microcomputer (not shown) buried in the base section 8D. Each pressure sensor 10 is electrically connected to the controller 9. In other words, the patterned planar conductive film 8 is provided with a planar array of pressure sensors 10 as an electrically conductive element buried therein. Each pressure sensor 10 is turned conductive to provide for the controller 9 a signal when the cushioning pad 2 contracts due to an external impact force in such a manner as will be described later As shown in FIG. 3, the pressure sensor 10 comprises upper and lower flexible electrically conductive segments 11 and 12 separated by spacer blocks 14 that are disposed with a separation therebetween so as to provide a space 13 between the upper and lower electrically conductive segments 11 and 12. The electrically conductive segments 11 and 12 are covered by cover layers 15 and 16 respectively. It is desirable for the pressure sensor 10 to have a thickness between outer surfaces of the cover layers 15 and 16 of approximately 400 $\mu$m. As shown by an imaginary line in FIG. 3, the upper and lower electrically conductive segments 11 and 12 are brought into contact with each other to provide for the controller 9 a signal when an external load is applied to the pressure sensor 10 from above.

Accordingly, the planar conductive film 8 with a planar array of pressure sensors 10 buried therein functions as a planar sensor device to detect an occupant condition, e.g. occupant type and/or occupant location, on the seat cushion. The controller 9 controls actuation of an occupant associated protection system such as an air bag in response to a detected occupant condition represented by signals from the planar sensor device.

FIGS. 4 through 7 show an encircled part of the seat cushion 1 indicated by a circle A in FIG. 1 where the center lengthwise strip section 8A of the patterned planar conductive film 8 crosses over the transverse tuck-in groove 5. The following description is true of the transverse strip section 8C and the lengthwise tuck-in groove 4. The elastic cushioning pad 2 has a transverse tuck-in groove 5 and a generally inverted trapezoidal recess 17 across over the transverse tuck-in groove 5. The generally inverted trapezoidal recess 17 is comprised of a flat bottom wall 17a (which doubles part of a bottom 5a of the transverse tuck-in groove 5) and side walls 17b slanting outward in opposite transverse directions with respect to an upper surface 2U of the cushioning pad 2, respectively.

Figure 5:
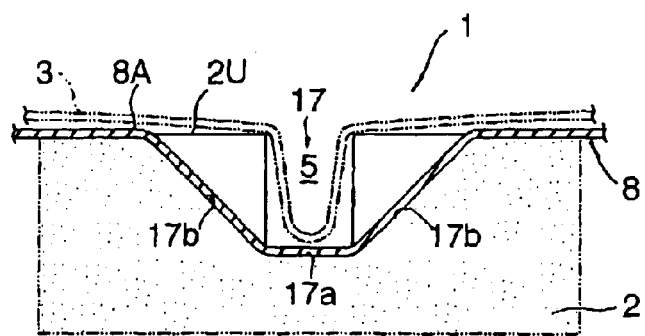
FIG. 5 is a cross sectional view of FIG. 4 taken along a line V—V.
Figure 6:
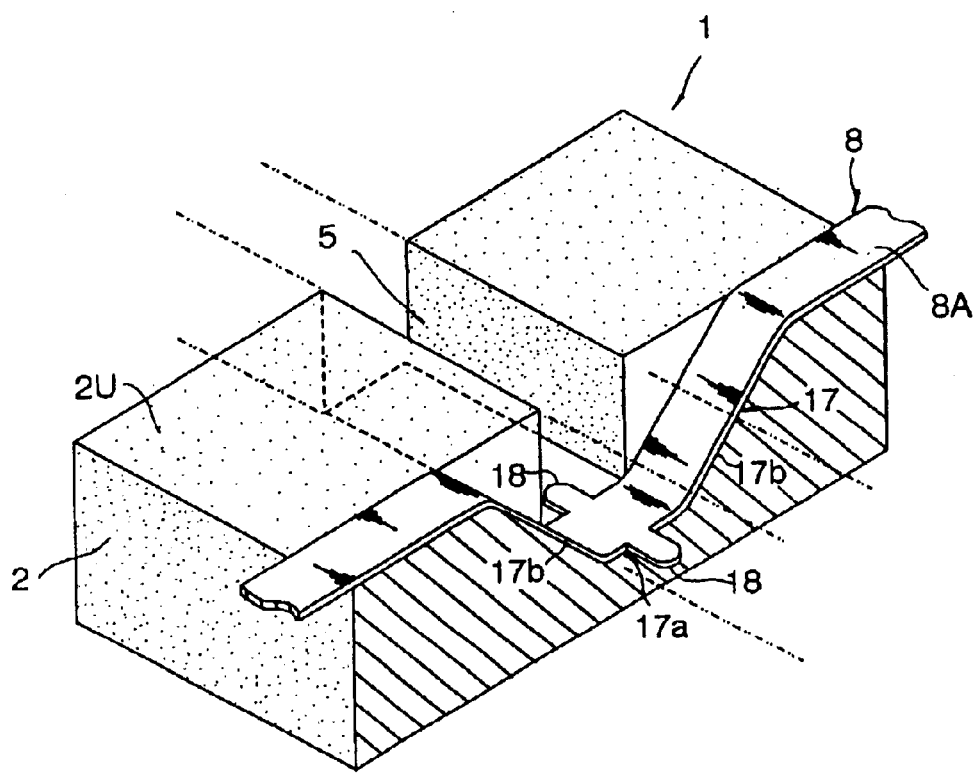
FIG. 6 is a perspective view of the part A of the seat cushion.

As shown in FIGS. 5 and 6, the lengthwise strip section 8A of the patterned planar conductive film 8 is locally forced into the generally inverted trapezoidal recess 17 and is then laid down on the bottom wall of the transverse tuck-in groove 5. The patterned planar conductive film 8 has a pair of tongues 18 having a specified length which extend perpendicularly from opposite sides of each strip section 8A, 8B, 8C at a location where the strip section is laid down on the bottom of the transverse tuck-in groove 5. Further, the patterned planar conductive film 8 has a specified length of reinforced portion 19 in each strip section that is forced in the generally inverted trapezoidal recess 17 such as shown in FIGS. 7A through 7D.

Figure 7A:
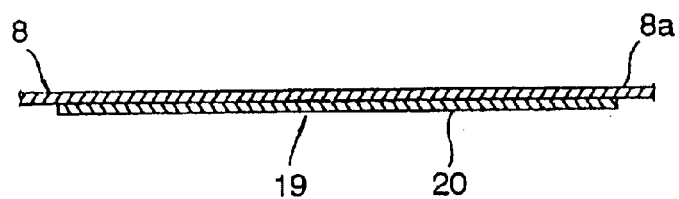
FIGS. 7A to 7D are explanatory views of various reinforcement structures.

Referring to FIG. 7A showing a reinforced portion 19 of each strip section 8A, 8B, 8C of the patterned planar conductive film 8, the reinforced portion 19 comprises a polyethylene terephthalate substrate 8a forming a part of the patterned planar conductive film 8 and a segmental reinforcing piece 20 fixed to the back of the polyethylene terephthalate substrate 8a. The reinforced portion 19 is a portion of the patterned planar conductive film 8 that is laid in the generally inverted trapezoidal recess 17 across over the transverse tuck-in groove 5 with a specified thickness, an enhanced slipping performance and a sufficient elasticity. It is desirable for the segmental reinforcing piece 20 to be made of plastic, or otherwise, polyethylene terephthalate or polyimide that satisfies the requirement that a segmental reinforcing piece is formed thin, slippery and elastic.

Figure 7B:
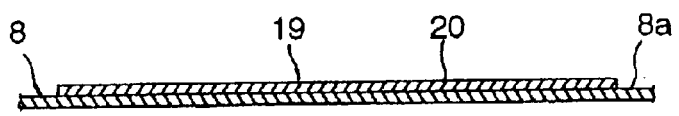

Referring to FIG. 7B showing an integrated reinforced portion of the strip section of the patterned planar conductive film 8, the reinforced portion 19 comprises a polyethylene terephthalate substrate 8a forming a part of the patterned planar conductive film 8 and a segmental reinforcing piece 20 fixed to the front of the PET substrate 8a. It is desirable for the segmental reinforcing piece 20 to be made of plastic, or otherwise, polyethylene terephthalate or polyimide in light of providing a portion of the patterned planar conductive film 8 that is laid in the generally inverted trapezoidal recess 17 across over the transverse tuck-in groove 5 with a specified thickness, an enhanced slipping performance and a sufficient elasticity.

Figure 7C:
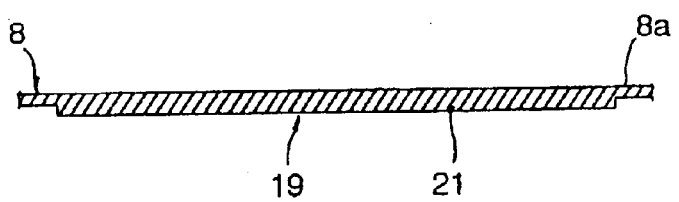

Referring to FIG. 7C showing an integrated reinforced portion of the strip section of the patterned planar conductive film 8, the reinforced portion 19 comprises a polyethylene terephthalate substrate 8a having an integrated thickening portion 21 at a back side of the patterned planar conductive film 8 that is laid in the generally inverted trapezoidal recess 17 across over the transverse tuck-in groove 5.

Figure 7D:
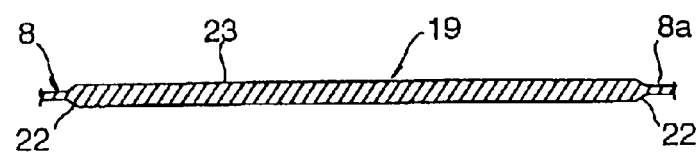

Referring to FIG. 7D showing another reinforced portion of the strip section of the patterned planar conductive film 8, the reinforced portion 19 comprises a polyethylene terephthalate substrate 8a having an integrated thickening portion 23 at front and back sides of the patterned planar conductive film 8 that is laid in the generally inverted trapezoidal recess 17 across over the transverse tuck-in groove 5. The patterned planar conductive film 8 has slant faces 22 between the integrated thickening portion 23 and the polyethylene terephthalate substrate 8a.

The integrated reinforced portion 19 having the thickening portion 21 or 23 formed as an integrated portion of the polyethylene terephthalate substrate 8a such as shown in FIG. 7C or 7D satisfies the requirement because polyethylene terephthalate itself can be formed thin and slippery and has sufficient elasticity. The formation of thickening portion eliminates the process of fixing a segmental reinforcing piece to the polyethylene terephthalate substrate 8a.

Figure 8:
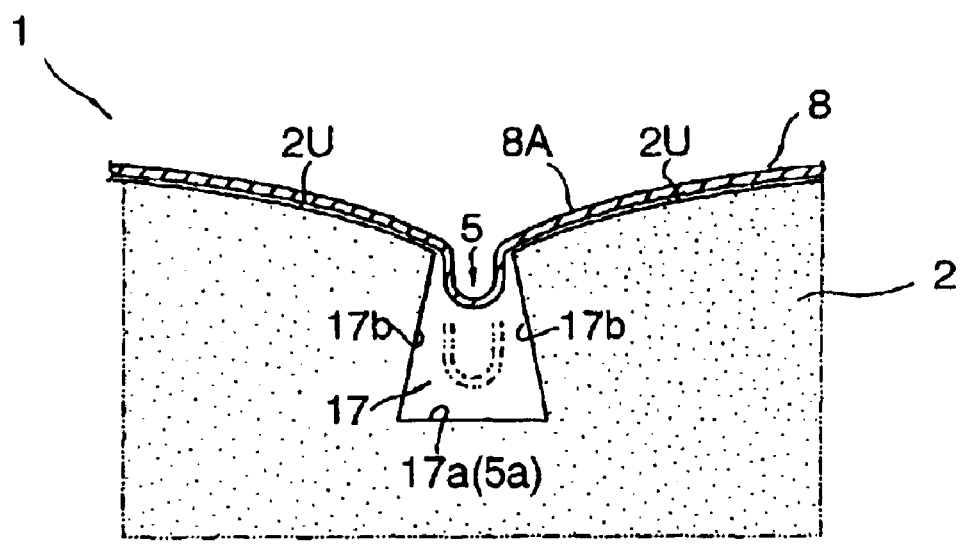
FIG. 8 is an explanatory view of the seat cushion with an external load exerted thereon.

As was previously described, the patterned planar conductive film 8 is laid between the elastic cushioning pad 2 and the seat covering 3 with the integrated reinforced portion laid in the transverse tuck-in groove 5 as shown in FIG. 5. While the sear cushion 1 is free of external impact force from above, the integrated reinforced portion of the patterned planar conductive film 8 lies along the bottom and slanted side walls 17a and 17b. When the seat cushion 1 experiences external impact force from above, while the elastic cushioning pad 2 is compressed, the patterned planar conductive film 8 is stretched outward as shown in FIG. 8. Specifically, the patterned planar conductive film 8 slides on the upper surface 2U of the cushioning pad 2 with the integrated reinforced portion risen up to a state shown by a solid line passing through an interim state shown by an imaginary line.

According to the seat cushion 1, when the seat cushion 1 repeatedly experiences external impact force from above, the patterned planar conductive film 8 except reinforced portions laid in the tuck-in grooves 4 and 5 produces widespread flexure in response to contraction of the cushioning pad and, in consequence, diminishes its local slacks or inelastic bending laid in the tuck-in grooves consequently. That is, the patterned planar conductive film 8 ends up with absorption of the slacks or inelastic bending through its overall area. As a result, the patterned planar conductive film 8 prevents an occurrence of breakage or damage, and hence an occurrence of an electrical disconnection (a pattern crack) of the conductive element resulting from the breakage or damage.

In a nutshell, the seat cushion 1 shown by way of example in FIGS. 1 through 8 comprises the cushioning pad 2 with the lengthwise and transverse tuck-in grooves 4 and 5 formed therein and the seat covering 3 between which the patterned planar conductive film 8 with a planar conductive element buried therein is embedded. The patterned planar conductive film 8 has the reinforced portions 19 having an increased thickness that are laid in the lengthwise and transverse tuck-in grooves 4 and 5. The patterned planar conductive film 8 at the reinforced portions 19 is resistant to bend and, consequently, prevented from causing an electric disconnection (a pattern crack). Further, even when the patterned planar conductive film 8 at the reinforced portions laid in the tuck-in grooves 4 and 5 causes slacks or inelastic bending resulting from contraction of the seat cushion due to external impact force, the planar conductive film 8 except the reinforced portions slides on the cushioning pad 2 and produces widespread flexure in response to the contraction of the cushioning pad and, in consequence, absorbs the slacks or inelastic bending through the widespread flexure. As a result, the patterned planar conductive film 8 prevents an occurrence of breakage or damage, and hence an occurrence of an electrical disconnection (a pattern crack) of the conductive element resulting from the breakage or damage. In addition, the tuck-in grooves 4 and 5 are not required to be shallow or crushed in order to lay the planar conductive film 8 locally therein, the seat cushion can be designed for improved attractive appearance.

In the case where the patterned planar conductive film 8 has the reinforced portions 19 having an integrated reinforced portion made more slippery and more elastic than the remaining portion thereof, the patterned planar film 8 is hard to produce slacks or inelastic bending in the tuck-in grooves 4 and 5 due to slippage or elasticity. In consequence, the patterned planar conductive film 8 at the integrated reinforced slacks or inelastic bending in the tuck-in grooves 4 and 5 due to slippage or elasticity. In consequence, the patterned planar conductive film 8 at the integrated reinforced portions 19 prevents an occurrence of an electric disconnection (a pattern crack) of the electrically conductive element. Further, even when the patterned planar conductive film 8 at the integrated reinforced portions laid in the tuck-in grooves 4 and 5 causes slacks or inelastic bending resulting from contraction of the seat cushion 1 due to external impact force, the planar conductive film 8 except the integrated reinforced portions 19 slides on the cushioning pad 2 and produces widespread flexure in response to the contraction of the cushioning pad 1. As a result the patterned planar conductive film 8 prevents an occurrence of breakage or damage, and hence an occurrence of an electrical disconnection (a pattern crack) of the electrically conductive element resulting from the breakage or damage. In addition, the tuck-in grooves 4 and 5 are not required to be shallow or crushed in order to lay the planar conductive film 8 locally therein, the seat cushion 1 can be designed for improved attractive appearance.

In the case where the planar conductive film 8 is used as a planar sensor device operative to detect an occupant sitting on the seat cushion 1 or a child secured in a child safety seat put on the seat cushion 1, the planar sensor device can reliably control actuation of an occupant associated protection system.

The reinforced portion 19 is formed by fixing a segmental reinforcing piece 20 made of plastic to at least one of opposite surfaces of the planar conductive film 8. The segmental reinforcing piece 20 is conveniently used to provide easily the planar conductive film with required thickness, slipping performance and elasticity locally. grooves 4 or 5, the planar conductive film 8 at the reinforced portions 19 provides elasticity and restoration ability more effectively with respect to the tuck-in grooves 4 and 5, so as thereby to prevent the electrically conductive element from sustaining pattern cracks or electric disconnections.

The planar conductive film 8 used as a planar sensor device includes a planar array of pressure sensors 10 operative to turn conductive when receiving external impact force from above. Specifically, the pressure sensor 10 comprises the upper and lower flexible electrically conductive segments 11 and 12 that are brought into contact with each other to turn conductive when receiving pressure from above. The planar sensor device is prevented from causing a pattern crack or electric disconnection of the planar array of pressure sensors, the occupant protection system is appropriately controlled in actuation.

The planar conductive film 8 is provided with integrated tongues 18 extending perpendicularly from opposite lengthwise sides of the reinforced portion 19, in other words, in a lengthwise direction of the tuck-in groove. The planar conductive film 8 at the reinforced portions is prevented from causing positional displacement due to increased thickness, enhanced slippage performance and elasticity when the seat cushion receives external impact force from above and, in consequence, provides positioning convenience.

Figure 9:
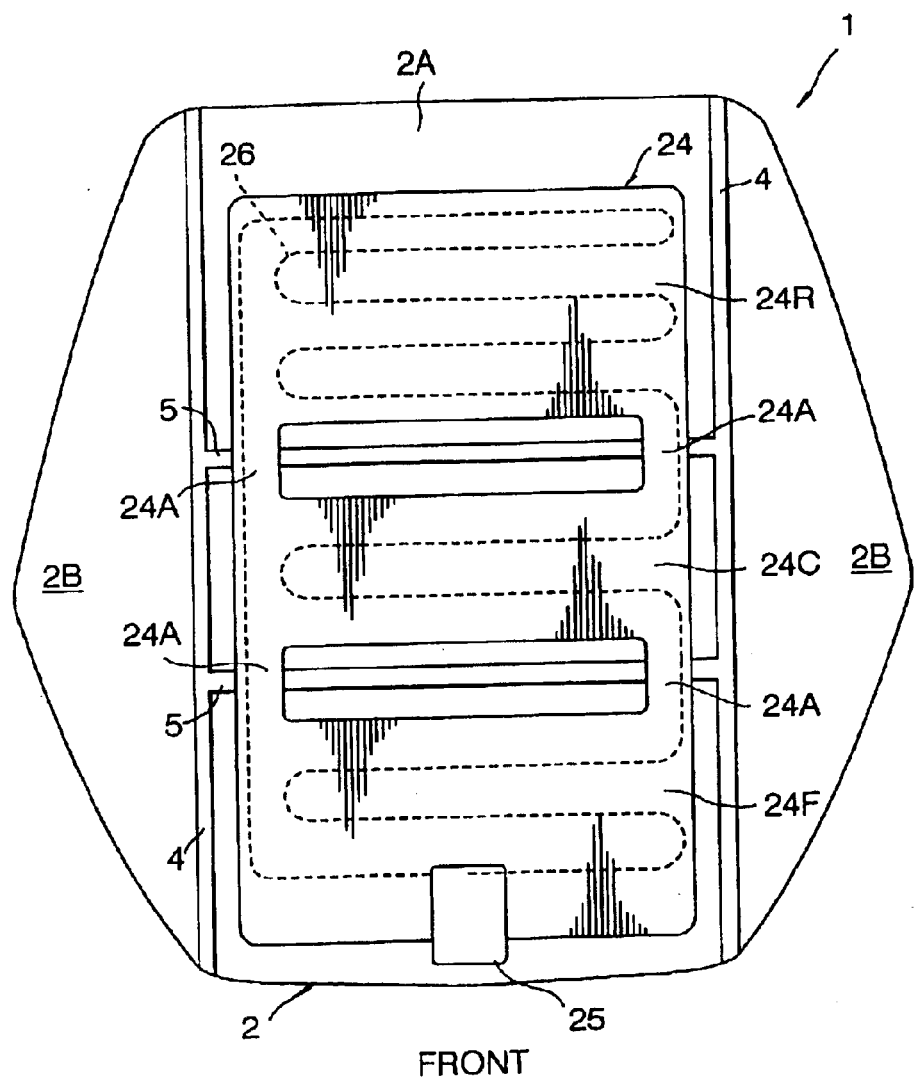
FIG. 9 is a plan view of a seat cushion for a vehicle seat unit according to another embodiment of the present invention.
Figure 10:
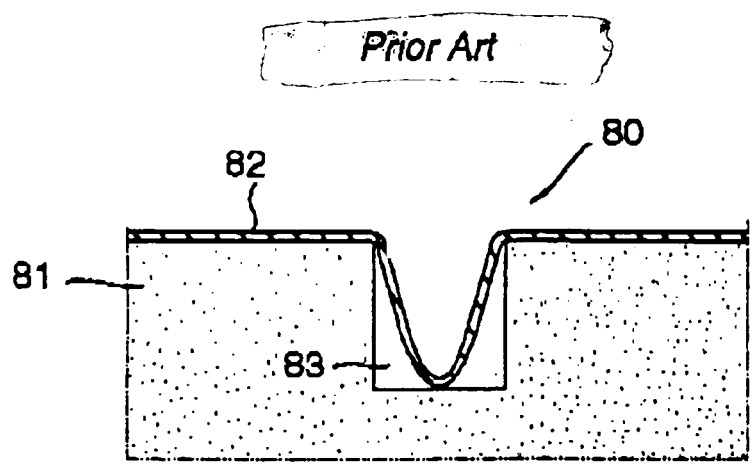
FIG. 10 is a cross sectional view of a prior art seat cushion.
Figure 11:
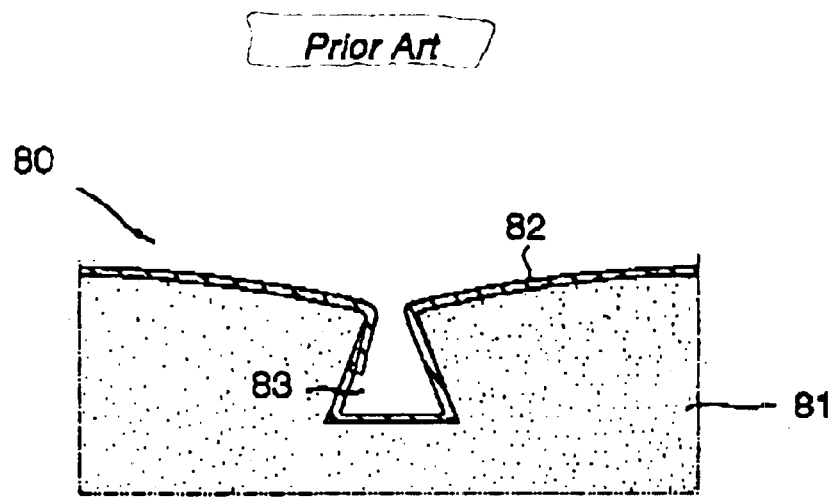
FIG. 11 is an explanatory cross sectional view of the seat cushion of FIG. 10 showing an appearance of damage of a planar conductive film.
Figure 12:
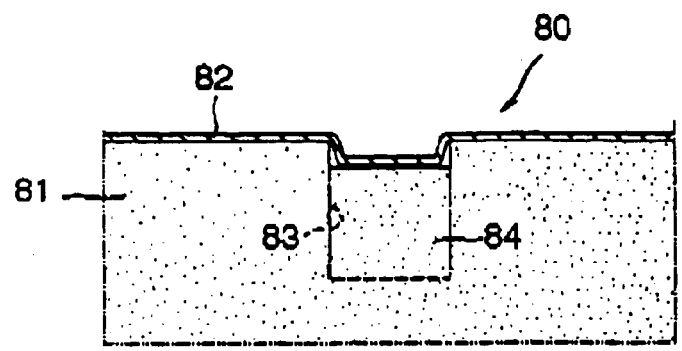
FIG. 12 is a cross sectional view of the prior art seat cushion in which a modified tuck-in grooves are provided.
Figure 13:
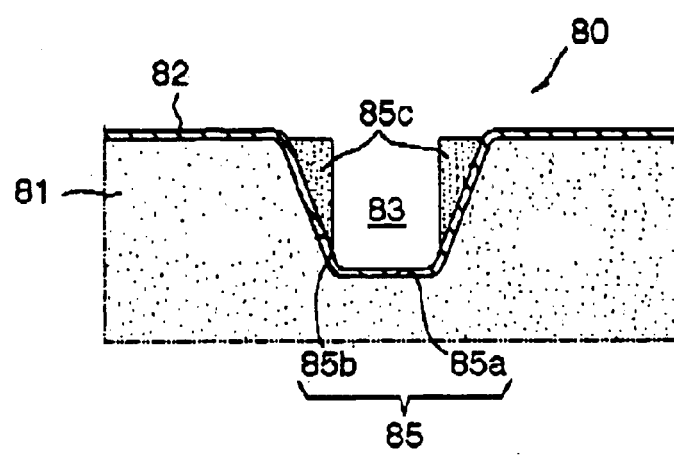
FIG. 13 is a cross sectional view of the prior art seat cushion in which an alternative tuck-in grooves are provided.
Figure 14:
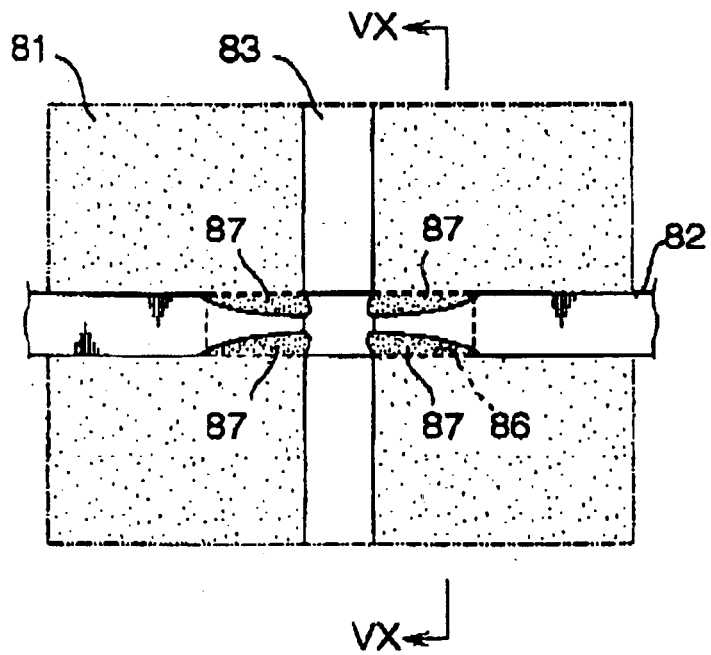
FIG. 14 is a plan view of the prior art seat cushion in which a still alternative tuck-in grooves are provided.
Figure 15:
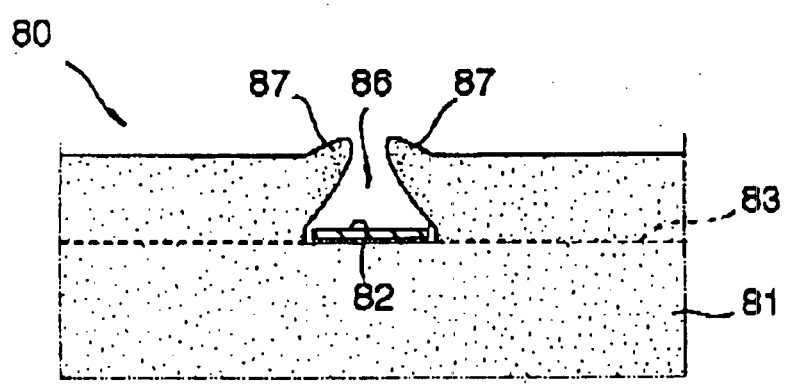
FIG. 15 is a cross sectional view of the seat cushion of FIG. 14 taken along a line XV—XV.

FIG. 9 shows a seat cushion 1 for a vehicle seat unit according to another embodiment of the present invention that is used as a planar seat heating film, the seat cushion 1 comprises an elastic cushioning pad 2 made of such as urethane, an seat covering (not shown) covering the cushioning pad 2, and a flexible but inelastic film 24 such as a polyethylene terephthalate film with a nichrome or heating wire 26 as an electrically conductive element buried in the flexible and inelastic film 24 (which is hereafter referred to as a planer conductive film for simplicity) that is disposed between the cushioning pad 2 and the seat covering. The elastic cushioning pad 2 is formed as one integral piece and comprises three sections, namely a seat section 2A and two side support sections 2B at opposite side of the seat section 2A. The elastic cushioning pad 2 has a lengthwise tuck-in groove 4 formed along a border between the seat section 2A and each side support section 2B and two transverse tuck-in grooves 5 formed in a central portion of the seat section and extending between the opposite lengthwise tuck-in grooves 4 so as thereby to divide the seat section 2A into three sub-sections, namely front, center and rear sub-sections.

The planar conductive film 24 is formed as one integral piece divided into three sections, namely front, center and rear sections 24F, 24C and 24R, respectively, corresponding in position to the front, middle and rear sub-sections of the seat section 2A, respectively. These front, center and rear sections 24F, 24C and 24R at transversely opposite sides are connected in series by side strips 24A extending across over the transverse tuck-in grooves 5. The heating wire 26 runs meandering in the respective sub-sections 24F, 24C and 24R of the planar conductive film 24 and is electrically connected to a connector 25 disposed at a front end of the front sub-section 24F thereof. The heating wire 26 is supplied with electric power from power supply means such as a battery installed in the vehicle through the connector 25 to generate heat.

Each of the side strips 24A, that is laid in the transverse tuck-in groove 5, is formed as the same in structure as the integrated reinforced portion 19 of the patterned planar conductive film 8 (se FIGS. 7A to 7D) of the previous embodiment. The cushioning pad 2 may be preferably provided with a generally inverted trapezoidal recess extending across over the transverse tuck-in groove 5 such as shown in FIG. 5 in which the side strip 24A of the planar conductive film 24 is laid.

According to the planar conductive film 24 formed as a planar seat heater, the heating wire 26 is prevented from causing an electric disconnection due to an occurrence of breakage or damage of the planar conductive film 24.

The present invention has been described with reference to preferred embodiments thereof. However, it will be appreciated that variants and other embodiments can be effected by person of ordinary skill in the art without departing from the scope of the invention.

What is claimed is:

1. A seat cushion for a vehicle seat comprising:
   a cushioning pad;
   a seat covering with which said cushioning pad is upholstered, and
   planar conductive means with an electrically conductive element buried therein that is disposed between said cushioning pad and said seat covering;
   wherein said cushioning pad has a plurality of tuck-in grooves in which said seat covering is locally retained and said planar conductive means is provided with reinforced portions that are laid across said tuck-in grooves and are made thicker than the remaining portion of said planar conductive means.

2. A seat cushion for a vehicle seat as defined in claim 1, wherein said planar conductive means comprises a planar sensor device that operates to detect an occupant sitting on said seat cushion.

3. A seat cushion for a vehicle seat as defined in claim 2, wherein said planar sensor device comprises a planar array of pressure sensors operative, each said pressure sensor comprising upper and lower electrically conductive segments that are brought into contact with each other when said pressure sensor receives an external load from above.

4. A seat cushion for a vehicle seat as defined in claim 1, wherein each said reinforced portion is formed by a segmental reinforcedment fixed to at least one of opposite sides of said planar conductive means.

5. A seat cushion for a vehicle seat as defined in claim 1, wherein each said reinforced portion is formed in a direction perpendicular to said tuck-in groove.

6. A seat cushion for a vehicle seat as defined in claim 1, wherein said planar conductive means is provided with a pair of integrated tongues that extend in a direction of said tuck-in groove from opposite sides of said planar conductive means, respectively, at a location where said planar conductive means transverse said tuck-in groove.

7. A seat cushion for a vehicle seat comprising:

a cushioning pad;

a seat covering with which said cushioning pad is upholstered, and planar conductive means with an electrically conductive element buried therein that is disposed between said cushioning pad and said seat covering;

wherein said cushioning pad has a plurality of tuck-in grooves in which said seat covering is locally retained and said planar conductive means is provided with reinforced portions that are laid across said tuck-in grooves and are made more slippery and/or more elastic than the remaining portion of said planar conductive means.

* * * * *